United States Patent
Schöps et al.

(10) Patent No.: US 6,235,657 B1
(45) Date of Patent: *May 22, 2001

(54) LAMINATE WITH WEB AND LAID COMPONENTS

(75) Inventors: Michael Schöps, Grossaitingen; Franz Kaulich; Bertrand Claude Weiter, both of Bobingen, all of (DE)

(73) Assignee: Johns Manville International, Inc., Denver, CO (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/070,564

(22) Filed: Jun. 1, 1993

(30) Foreign Application Priority Data

May 30, 1992 (DE) ............................................. 92 07 367 U

(51) Int. Cl.[7] ............................ D04H 13/00; D04H 5/02; B32B 5/26
(52) U.S. Cl. ........................... 442/57; 428/489; 428/332; 428/338; 428/137; 428/110; 428/430; 428/109; 428/102; 428/292.1; 442/32; 442/35; 442/36; 442/20; 442/50; 442/51; 442/58; 442/54; 442/406; 442/402; 442/388; 442/367; 442/331; 442/270; 442/240; 442/383
(58) Field of Search ........................ 428/489, 332, 428/338, 137, 110, 430, 109, 102, 292.1; 442/32, 35, 36, 20, 50, 51, 58, 57, 54, 406, 402, 388, 367, 331, 270, 240, 383

(56) References Cited

U.S. PATENT DOCUMENTS

| | | | |
|---|---|---|---|
| 3,957,554 | * 5/1976 | Sundin | 428/236 |
| 4,242,779 | * 1/1981 | Carinier et al. | 28/101 |
| 4,491,617 | * 1/1985 | O'Connor et al. | 428/236 |
| 4,522,876 | * 6/1985 | Hiers | 428/285 |
| 4,576,858 | * 3/1986 | Fourezon | 428/300 |
| 4,617,227 | * 10/1986 | Weaver | 428/220 |
| 4,657,801 | * 4/1987 | Heidel et al. | 428/137 |
| 4,683,164 | * 7/1987 | Kaulick | 428/287 |
| 4,755,423 | * 7/1988 | Greiser et al. | 428/284 |
| 4,780,350 | * 10/1988 | O'Connor et al. | 428/109 |
| 4,987,027 | * 1/1991 | Zerfass et al. | 428/297 |
| 5,017,426 | * 5/1991 | Greiser et al. | 428/280 |
| 5,047,276 | * 9/1991 | Chomaral et al. | 428/110 |
| 5,118,550 | * 6/1992 | Baravian et al. | 428/90 |
| 5,130,178 | * 7/1992 | Zerfass et al. | 428/198 |
| 5,173,355 | * 12/1992 | Vock et al. | 428/288 |
| 5,182,161 | * 1/1993 | Andrusko | 428/219 |
| 5,219,635 | * 6/1993 | Weiter et al. | 428/172 |
| 5,219,647 | * 6/1993 | Vock et al. | 428/288 |
| 5,474,838 | * 12/1995 | Callaway et al. | 428/102 |

FOREIGN PATENT DOCUMENTS

| | | |
|---|---|---|
| 2031812 | * 6/1991 | (CA) . |
| 0 176 847 | 4/1986 | (EP) . |
| 0 242 524 | 10/1987 | (EP) . |
| 0 315 553 | 5/1989 | (EP) . |
| 0 413 295 | 2/1991 | (EP) . |
| 0 432 620 | 6/1991 | (EP) . |
| 2278491 | * 2/1976 | (FR) . |
| 2 226 054 | 6/1990 | (GB) . |

OTHER PUBLICATIONS

European Search Report EP 93108354.7.

* cited by examiner

Primary Examiner—William P. Watkins, III
(74) Attorney, Agent, or Firm—Burns, Doane, Swecker & Mathis LLP

(57) ABSTRACT

There are described a dimensionally stable laminate whose surfaces are formed by spunbonded webs and comprising at least two layers of spunbonded and at least one laid layer of reinforcing yarn, the laid layer or layers each being disposed between two layers of spunbonded and having a thread density of from 0.5 to 3 threads/cm, spunbonded and laid layers having been joined together by needling at about 20–70 stitches/cm$^2$, a process for manufacturing this laminate, and its use for manufacturing roofing sheets and roof sealing sheets.

19 Claims, 2 Drawing Sheets

LAMINATE WITH WEB AND LAID COMPONENTS

BACKGROUND OF THE INVENTION

1. Field of the Invention

The present invention relates to a dimensionally stable laminate which is formed from at least two layers of web and at least one layer of a laid structure and is useful in particular for reinforcing bitumen sheets.

2. Description of the Prior Art

GB-B-1 517 595 discloses a similar material in which a laid network of glass fiber is incorporated into an organic fiber nonwoven and the resulting assembly is then consolidated by application of an acrylate binder.

EP-B-110 039 similarly discloses an at least 3-layered laminate composed of web and laid components. In one embodiment, this known laminate comprises two layers of organic fiber web enclosing a layer of laid mineral fiber, for example glass fiber. In this known material, the bonding between the web layers and the laid layer is by hot melt adhesive.

German utility model DE-U-7 424 706 discloses a filter material comprising a web onto which a woven or laid structure is needled in such a way as to form a fiber pile on the nonwoven remote side of the woven or laid structure.

The materials disclosed in the cited references GB-B-1 517 595 and EP-B-110 039 are recommended for manufacturing bituminous roofing sheets.

Yet, when used in this way, they have the serious defect of tending to warp and crack under thermal stress. This defect can lead to production problems even at the stage of the known laminates being impregnated with hot bitumen, but, when the bituminous sheets are hot laid on the roof or later exposed to fluctuating insolation, it can also lead to leakiness in the roof membrane produced.

These problems are addressed in DE-A-3 941 189 and it is stated there that these defects of existing materials are due to the very different reactions (e.g. extensibility, modulus changes, shrinkage) of the fiber materials used in the web and in the reinforcement (polyester fiber in the web and glass fiber in the reinforcement) to mechanical and/or thermal stress. It is therefore proposed in said reference that to remove the stated defects of existing materials nonwovens be reinforced not with textile sheet materials, such as glass mats or weaves, but with individual reinforcing strands incorporated in the nonwoven in a spaced-apart parallel arrangement. Bonding is by chemical binding agents, by needling and/or thermally.

The materials obtained according to this proposal do indeed show improved thermal stability. However, they do not have the particularly important high mechanical stability required for reinforcing bituminous sheets, and the manufacture of such nonwovens, reinforced with individual filaments, proved to be very costly and troublesome.

It is an object of the present invention to provide laminates which are dimensionally stable under thermomechanical stress and are easy to manufacture.

SUMMARY OF THE INVENTION

The present invention accordingly provides a laminate whose surfaces are formed by spunbonded webs and which comprises two or more layers of spunbondeds, preferably two layers, and one or more, preferably one, layers of laid reinforcing yarns, the laid layer or layers each being disposed between two spunbonded layers and having a thread density of from 0.5 to 3 threads/cm, preferably from 0.5 to 2 threads/cm, the spunbonded and laid components being bonded to one another by needling at about 20–70 stitches/$cm^2$, preferably 40–60 stitches/$cm^2$.

BRIEF DESCRIPTION OF THE DRAWINGS

The laminate of the invention thus comprises a number N of spunbonded layers and a number L=N−1 of laid layers. In general, N is from 2 to 4, but to meet certain requirements it can also be higher. Preference is given to N=2, so that preferred laminates of the invention comprise two plies of spunbonded with a laid layer in between. FIG. 1 is a diagrammatic section through such a preferred laminate (1), showing the two web layers (2, 2'), the in-between laid layer (3), the filaments (4), which extend from the outer web layer through the layered structure and ensure a firm bond between the layers and the reinforcing yarns (5) making up the laid layer (3).

Figure 1:
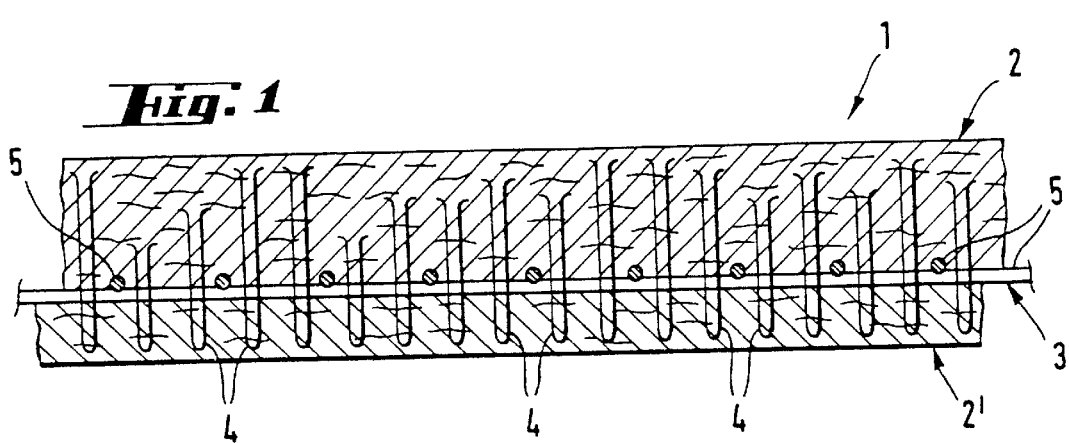
FIG. 1 shows a section of a preferred laminate.

The basis weight of the laminates of the invention is from 60 to 400 $g/m^2$ preferably from 80 to 250 $g/m^2$. Of this the laid structure accounts for from 3 to 20, preferably from 4.5 to 10, $g/m^2$.

The spunbondeds are preferably produced by a random laying-down of freshly melt-spun filaments.

They are made of continuous synthetic fiber composed of melt-spinnable polymer materials. Suitable polymer materials are for example polyamides, e.g. polyhexamethyleneadipamide, polycaprolactam, wholly or partly aromatic polyamides (aramids), wholly or partly aromatic polyesters, polyphenylene sulfide (PPS), polymers with ether and ketogroups, e.g. polyether ketones (PEKs) and polyether ether ketone (PEEK), and polybenzimidazoles.

The spunbondeds are preferably made of melt-spinnable polyesters.

The polyester material used can in principle be any known type suitable for fibermaking. This type of polyester consists predominantly of units derived from aromatic dicarboxylic acids and from aliphatic diols. Widely used aromatic dicarboxylic acid units are the bivalent radicals of benzenedicarboxylic acids, in particular of terephthalic and isophthalic acid; widely used diols have 2–4 carbon atoms, ethylene glycol being particularly suitable. Of particular advantage are laminate sheets according to the invention whose webs are made of a polyester material which is at least 85 mol % polyethylene terephthalate. The remaining 15 mol % are then composed of dicarboxylic acid units and glycol units, which function as modifiers and make it possible for the person skilled in the art to control the physical and chemical properties of the filaments produced. Examples of such dicarboxylic acid units are radicals of isophthalate acid and of aliphatic dicarboxylic acids such as glutaric acid, adipic acid and sebacic acid; examples of modifying diol radicals are those of long-chain diols, e.g. of propane diol or butane diol, of di- or tri-ethylene glycol or, if present in small amounts, of polyglycol having a molecular weight of about 500–2000.

Particular preference is given to polyesters which are at least 95 mol % polyethylene terephthalate, in particular to those made of unmodified PET.

If the laminates of the invention are additionally to have a flame retardant effect, they contain with particular advantage spunbondeds spun from polyesters modified to be flame retardant. Polyesters so modified are known. They contain additions of halogen compounds, in particular bromine compounds, or—and this is particularly advantageous—they contain phosphorus compounds which have been condensed into the polyester chain.

Particularly preferred flame retardant laminates according to the invention comprise spunbondeds made of polyesters which contain condensed into the chain structural groups of formula I

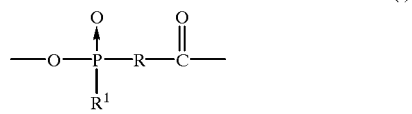

(I)

where R is alkylene or polymethylene of from 2 to 6 carbon atoms or phenyl and $R^1$ is alkyl of 1 to 6 carbon atoms, aryl or aralkyl.

Preferably, in the formula I, R is ethylene and $R^1$ is methyl, ethyl, phenyl or o-, m- or p-methylphenyl, in particular methyl.

Spunbondeds of this type are described for example in DE-A-3 940 713.

The polyesters present in the webs according to the invention have a molecular weight corresponding to an intrinsic viscosity (IV), measured in a solution of 1 g of polymer in 100 ml dichloroacetic acid at 25° C., of from 0.7 to 1.4.

Laid structures for the purposes of the present invention are yarn structures formed from mutually angled sets of parallel reinforcing yarns fixed to one another at their cross-over points.

The angle between the crossing sets of yarn is in general between 10° and 90°. A laid structure can of course contain more than just two sets of yarn. The number of and direction of the sets of yarn depends on possible special requirements.

Figure 2:
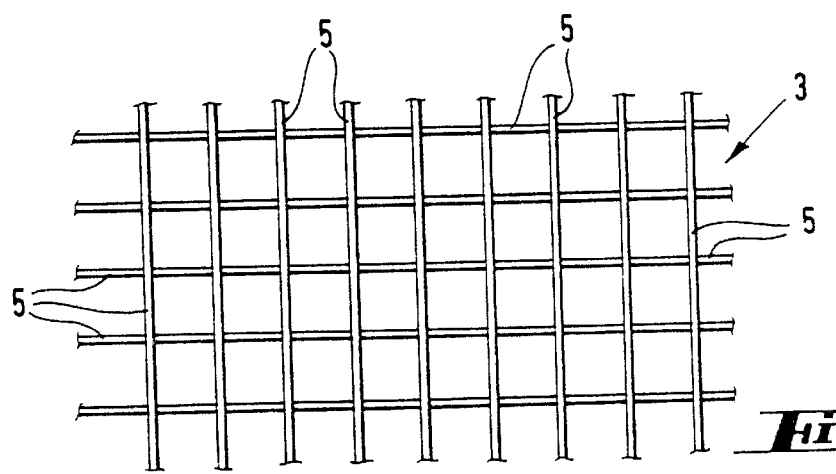
FIGS. 2, 3, and 4 show various laid structures.
Figure 3:
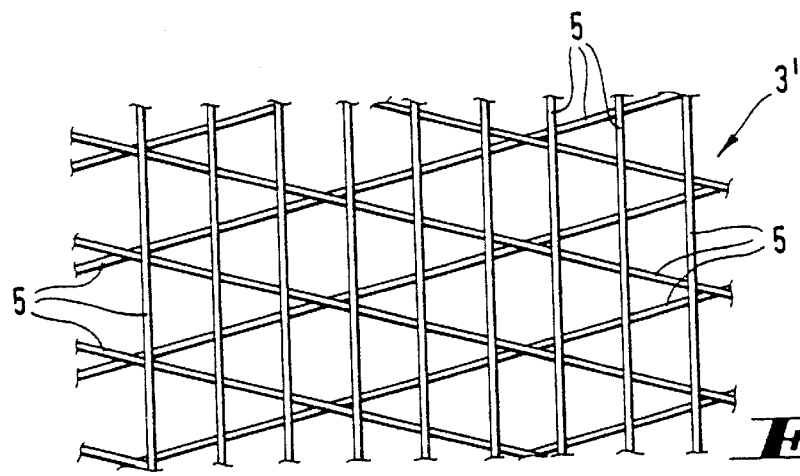

Preference is given to laminates based on laid structures comprising two sets of yarn crossing at an angle of preferably 90°. If a particularly high mechanical stability is required in one direction, for example the longitudinal direction, of the laminate, it is advisable to incorporate a laid structure formed in the longitudinal direction of a set of yarns with a lower inter yarn spacing, stabilized for example by a transverse set of yarn or by two sets of yarn forming angles of respectively about +40° to +70° and −40° to −70° with the first set. FIGS. 2 and 3 exemplify the arrangement of the reinforcing yarns (5) in such laid structures (3) and (3').

Particular stability requirements in all directions can be met with a laid structure having 4 or 5 sets of yarn which are superposed in various directions and bonded to one another at the yarn cross-over points.

Figure 4:
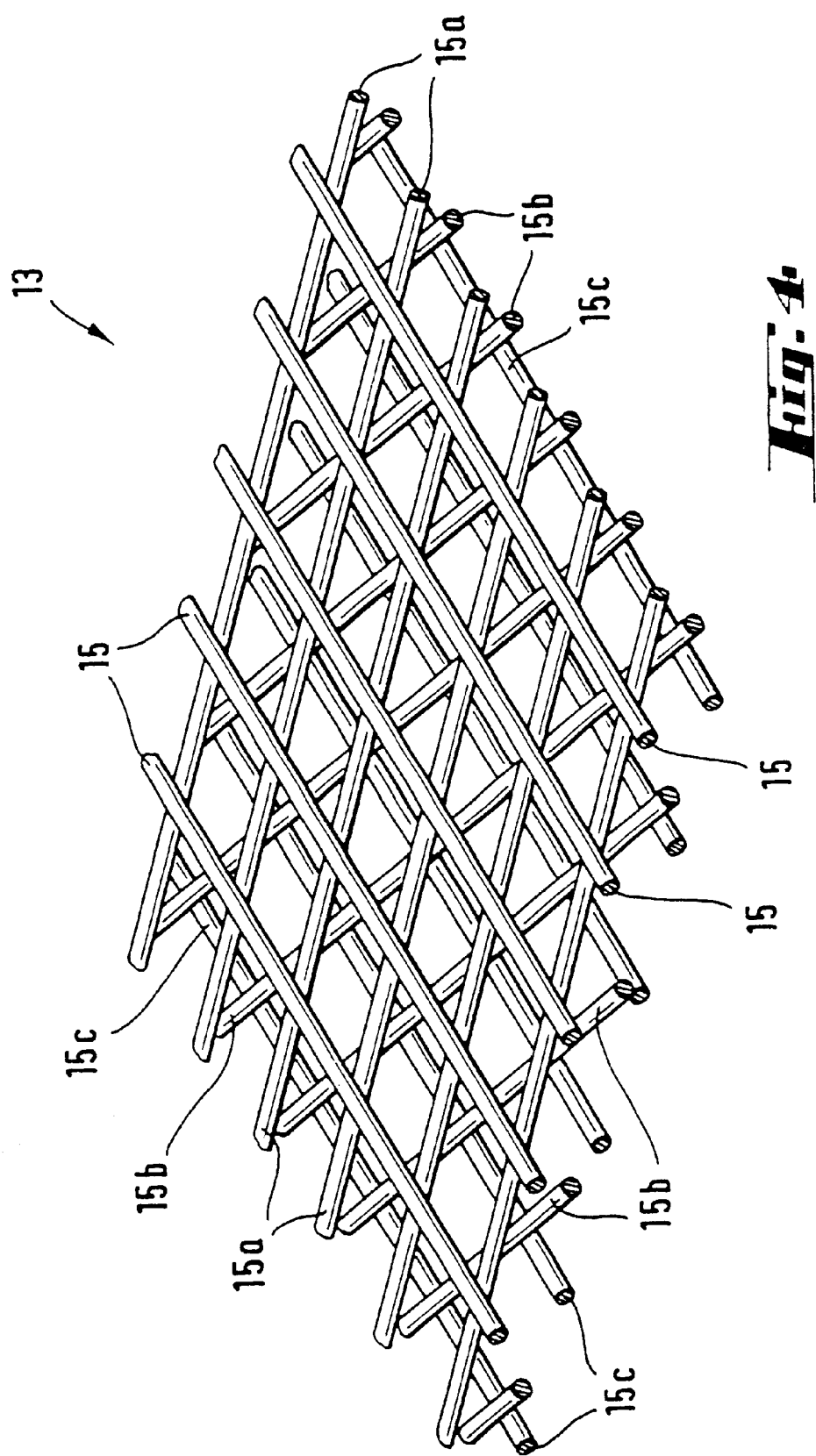

One example of such a special structure (13) which features three sets of yarn extending in different directions (15; 15a; 15b) and additionally a set of yarn which is parallel with one of these sets of yarn but extends in a fourth plane (15c) is shown in FIG. 4 in an oblique plan view.

The above-specified thread density of from 0.5 to 3 threads/cm is measured perpendicularly to the particular yarn direction. As mentioned earlier, the yarn density can be the same in all the sets of yarn present, or, within these limits, different thread densities can be chosen according to the likely stress.

Particular preference is given to laminates according to the invention which contain a laid structure with a thread density of from 0.5 to 1 thread/cm.

The fixing of the crossing reinforcing yarns at their cross-over points can be effected in the case of yarns which soften without decomposing by autogenous melting at elevated temperature with or without the application of pressure. However, fixing can in any case be effected using commercially available chemical binding agents, for example polyvinyl alcohol or butadiene-styrene copolymers, or else using hot melt adhesives. In the case of flame retardant laminates according to the invention, fixing is accomplished using a flame retardant binding agent, for example a polyester with phosphoric or phosphonic acid groups, which is used as a hot melt adhesive.

It is of course also possible to use commercially available laid structures which conform to the above description.

The reinforcing yarns of the laid structures can in principle be staple fiber yarns or filament yarns, provided that they possess the desired combination of breaking strength and breaking extension. On account of their advantageous mechanical properties, filament yarns are preferred. The filament yarns are preferably made of glass.

However, suitable reinforcing yarn also includes polyester FOY (fully oriented yarn) as described in Chemiefasern/Textilindustrie 37/89, 1987, p. 794 ff., and yarns made of wholly aromatic polyamides, in particular those composed exclusively of para-disposed diamines and dicarboxylic acids (e.g. p-phenylenediamine and terephthalic acid). But it is also possible to use reinforcing yarns made of aromatic polyamides modified through the incorporation of meta-disposed building blocks with functional groups (e.g. isophthalic acid), or made of wholly aromatic polyamides formed randomly from various diamine and/or dicarboxylic acid building blocks. The laid structures of the laminates according to the invention may also contain reinforcing yarns made of other modulus fibers such as carbon fibers or fibers made of polyphenylene sulfide, PEEK (polyether ether ketone), PEK (polyether ketone) or polybenzimidazole.

The by far most versatile laminates according to the invention contain a laid structure formed from glass fiber.

The filaments of the reinforcing yarns may also have non-round cross sections, for example multilobal, dumbbell-shaped or ribbon-shaped cross sections.

The reinforcing yarns of the laid structures of the laminates according to the invention have a breaking extension of about 2.5–25%.

Within these relatively wide limits the desired extension can be achieved through the choice of yarn material. For instance, a very low extension of about 2.5 to 3.5% can be obtained by choosing glass fiber or aramid fiber, and a medium to high extension of 14 to 25% by choosing more or less oriented polyester fibers (these cover an extensibility range of from about 14 to 24%) or modified aramid fiber (e.g. (R)NOMEX). The tenacity is about 40 to 180 cN/tex, preferably 40 to 70 cN/tex. Here glass and polyester fibers respectively cover the tenacity range of about 40 to 50 and 40 to 70 cN/tex.

The linear density of the reinforcing yarns of the laid structures is advantageously 70 to 1200 dtex for organic fiber materials and about 30 to 130 tex for inorganic ones. In special cases, where a lower or a particularly high mechanical strength are desired, it can of course also be possible for a lower or higher linear density to be indicated for the reinforcing yarns.

In preferred laid structures formed from glass fiber reinforcing yarns, the yarns have linear densities of about 30 to 130 tex.

The hot air shrinkage of polyester reinforcing yarns at 160° C. is preferably 0.5 to 6%, measured in accordance with the test standard DIN 53 866.

Preference is given to those laminates according to the invention whose spunbondeds comprise polyester fiber, in particular polyethylene terephthalate, and whose laid reinforcing structures comprise glass or other thermally stable raw materials. Preference is given in particular to such a laminate when it is made up of two layers of web with a laid layer in between.

Particular preference is also given to a laminate according to the invention which is composed of two layers of web and a laid layer in between when the two layers of web have substantially the same basis weight.

For special applications it is particularly preferable to have a laminate according to the invention composed of two layers of web and a laid layer in between in which the layers of web have different basis weights, in which for example one of the layers of web is at least 20% thicker than the other.

The needled laminates of the mention can be additionally consolidated with a chemical binder.

The additional binder which may be present in the laminates of the invention includes for example the usual polymers which are applied in the form of dispersions. These are advantageously dispersions of polyvinyl alcohol (PVA) or butadiene-styrene copolymers.

Flame resistant binders as described for example in DE-A-3 901 152 are preferred.

In nonwovens of the invention which are not just needled but additionally consolidated, however, the binder is preferably a fusible binder. Suitable fusible binders are in particular modified polyesters having a melting point which is 10–50° C., preferably 30–50° C., lower than that of the nonwoven raw material. Examples of binders of this type are polypropylene, polybutylene terephthalate, and polyethylene terephthalate modified by cocondensation with long-chain diols and/or isophthalic acid or aliphatic dicarboxylic acids.

The fusible binders are preferably introduced into the webs in fiber form and are then preferably concentrated in those nonwoven layers which face the laid layer.

If laminates according to the invention which have flame retardant properties are additionally bonded, they preferably contain flame retardant binders. The flame retardant fusible binder present in the laminate of the invention can be for example a polyethylene terephthalate modified by incorporation of chain members of the above-indicated formula I.

Particular preference is also given to those filament reinforced nonwovens of the invention which possess a combination of preferred features.

The laminates of the invention are manufactured by laying the web fiber material down on a moving surface. The continuous filaments are advantageously laid down using spinning manifolds from which a fiber curtain is spun into a spinning and drawing cell where the fibers are simultaneously fluid cooled and accelerated and hence drawn.

The laid reinforcing structures are advantageously introduced from a delivery element from which the yarns pass in between two layers of web which are being laid down on the same surface by two successive (in the transport direction) rows of depositor elements.

It is of course also possible to produce laminates according to the invention by combining prefabricated web and laid layers on assembly machines and subsequent needling.

The choice of the laid structures used for manufacturing the filament reinforced nonwovens of the invention is made according to the above-specified criteria.

The laminate nonwoven is consolidated by needling the deposited web and laid layers using the above-specified number of stitches. If desired, an additional consolidation can be effected in a conventional manner by applying, for example spraying, binder solutions or dispersions or else preferably by introducing fusible binders with subsequent heat treatment at a temperature at which the fusible binder melts and the load-bearing filaments of the nonwoven become bonded together at their cross-over points.

The fusible binder is introduced into the web with particular advantage in the form of bonding filaments. These can be in the form of separate filaments, spun for example from separate openings in the spinning manifold and uniformly distributed in the descending fiber curtain, or they can be present as core or side of the load-bearing filaments or comprise part of the load-bearing filaments if appropriate jet openings for spinning core-sheath filaments or side-by-side two-component filaments are provided in the spinning manifold.

If the binder is a fusible binder, needling and binder application is followed by subjecting the laminate to a heat treatment at a temperature at which the fusible binder melts.

The laminates of the invention do not show any tendency to delaminate, nor do they warp or crack, even under high thermo-mechanical stress.

When being bituminized, the laminate sheets of the invention show a remarkably small widthways contraction, which in the case of a sheet about 1000 mm in width is only 2 to 4 mm, compared with the about 12 mm of conventional sheets. It is also found that the laminate of the invention gives planar, dimensionally stable, blister-free bitumen sheets even under rough bituminizing conditions. Moreover, the penetration resistance increases, as manifested in the punch pressure test of DIN 54 307. The result is an appreciably improved processibility and enhanced reliability for the laying of the bituminized roofing sheets of the invention on the roof.

These advantages of the reinforcing sheet of the invention are the surprising result of needling the web layers to the laid structure of reinforcing yarn. Even laminates according to the invention which contain lightweight laid structures with a thread density of 0.5 to 1 thread/cm exhibit a surprisingly high strength and stability advantage. The laid glass layer is covered by the two spunbonded polyester layers. This proves to be very advantageous for needling the laminate and for bituminization.

The present invention further provides a bituminized roofing sheet and a bituminized roof sealing sheet which contains as the load-bearing component a novel laminate with laid structure reinforcement.

These bituminized roofing or roof sealing sheets are manufactured by impregnating and/or coating the reinforcing sheets of the invention with molten bitumen in a conventional manner.

An embodiment of the invention will now be more particularly described to illustrate the production of the laminate of the invention and its use for manufacturing bituminous roofing sheet.

EXAMPLE

A spunbonder comprising 3 successive double spinning manifolds each with 27 jets of 92 holes each is used to extrude 200 g of polyethylene terephthalate melt per jet per minute. Each set of 92 filaments is divided and drawn in two injector nozzles in such a way that a filament linear density of 4 dtex results.

The filament curtain is randomly laid down onto a belt moving at a speed of about 20 m/min.

Between the second and the third double spinning manifold a laid glass scrim RG 0.8/0.8, 34 PVA of 6.5 g/m$^2$ is unwound off a braked unwinder into between the spun layers.

The two web layers with the embedded laid glass structure in between are gently preconsolidated by calendering and then gently needled at 40 stitches/cm² using 15×18×38 3" needles penetrating to 13 mm.

Then the web is the usual manner adopted for a standard material sprayed with an acrylate binder dispersion, dried on a drum dryer without stretching, and wound up. A continuous length of the 1010 mm wide laminate thus produced is impregnated in an impregnator at a temperature of 190° C. with oxidation bitumen of the type 95/35 at a linear speed of about 25 m/min.

After the sheet material has cooled down, an additional, topcoating composition comprising a polymer bitumen based on SBS (styrene/butadiene/styrene copolymer) is applied to it from a slot die at 170° C., and the bituminous sheet obtained is cooled down to about room temperature via cooling rolls. The basis weight of the ready-manufactured sheet is 3000 g/m².

The width of the sheet obtained is from 1007 to 1008 mm; that is, in the course of the bituminization it has contracted widthways only 2–3 mm. In the case of conventional sheets the widthways contraction under the same bituminization conditions is about 12 mm. Moreover, the bituminous sheet obtained on impregnating the laminate of the invention is stable and wave-free, and application of the topcoating composition likewise leaves a planar, dimensionally stable, blister-free bituminous sheet, whereas if the same bituminizing conditions are applied to conventional sheet materials, they become labile ("fluttery") on impregnating and blistery and longitudinally waved on application of the topcoating composition.

What is claimed is:

1. A laminate which exhibits improved dimensional stability combined with no tendency to delaminate and is capable of being bituminized in the absence of delamination to form a uniform roofing sheet of enhanced reliability comprising at least two layers of spunbonded web made of continuous synthetic fibers composed of melt spinnable polymer materials and at least one laid structure layer of reinforcing yarns formed from mutually angled sets of parallel reinforcing yarns fixed to one another at their crossover points and wherein the angle between the crossing sets of reinforcing yarns is between 10° and 90° and the laid structure layer is disposed between two layers of the spunbonded web, the laid structure layer having a thread density of 0.5 to 3 threads/cm and wherein the spunbonded and laid structure layers are joined together by needling at 20 to 70 stitches/cm² in the absence of the use of a thermoplastic adhesive to join said layers of spunbonded web and said laid structure layer wherein said thermoplastic adhesive is rendered functional through the simultaneous application of heat and pressure.

2. The laminate as claimed in claim 1, wherein the spunbonded webs are made of polyester fibers and the reinforcing yarns are made of glass or other thermally stable raw materials.

3. The laminate as claimed in claim 1, additionally consolidated with a chemical binder.

4. A laminate as claimed in claim 2, wherein the spunbonded webs are made of polyethylene terephthalate.

5. A laminate as claimed in claim 3, wherein the chemical binder is a flame retardant binder.

6. A laminate as claimed in claim 1, wherein the spunbonded and laid layers are joined together by needling at about 40–60 stitches/cm².

7. A laminate as claimed in claim 1, wherein the basis weight of the laminate is from 60 to 400 g/m² and the basis weight of said laid structure is 3 to 30 g/m².

8. A laminate as claimed in claim 1, wherein the basis weight of said laminate is from 80 to 250 g/m² and the basis weight of said laid structure is 4.5 to 10 g/m².

9. A laminate as claimed in claim 1, wherein the spunbonded webs are made of at least one polyamide.

10. A laminate as claimed in claim 1, wherein the spunbonded webs are made of at least one polyether.

11. A laminate as claimed in claim 2, wherein the polyester fibers contain bromine compounds or phosphorus compounds.

12. A laminate as claimed in claim 1, wherein the laid layer or layers have a thread density of 0.5 to 1 thread/cm.

13. A laminate as claimed in claim 1 wherein said laid structure of reinforcing yarns is formed from mutually angled sets of parallel reinforcing yarns that are fixed to one another at their crossover points at an angle of 90°.

14. A laminate as claimed in claim 1 wherein said laid structure of reinforcing yarns is formed from mutually angled sets of parallel reinforcing yarns that are fixed to one another at their crossover points at angles of about +40° to +70° and −40° to −70°, respectively.

15. A laminate as claimed in claim 1 wherein the thread density of said laid structure layer is 0.5 to 2 threads/cm.

16. A laminate as claimed in claim 1 wherein the reinforcing yarns of said laid structure exhibit a breaking elongation of 2.5 to 25%.

17. A laminate as claimed in claim 1 wherein the reinforcing yarns of said laid structure exhibit a breaking elongation of 2.5 to 3.5%.

18. A laminate as claimed in claim 1 wherein said spunbonded webs comprise continuous filaments of polyethylene terephthalate and said laid structure layer comprises yarns of continuous glass filaments.

19. A laminate having a basis weight of 80 to 250 g/m² which exhibits improved dimensional stability combined with no tendency to delaminate and is capable of being bituminized in the absence of delamination to form a uniform roofing sheet of enhanced reliability comprising at least two layers of spunbonded web made of continuous filaments of polyethylene terephthalate and at least one laid structure layer of reinforcing yarns having a basis weight of 4.5 to 10 g/m² formed from mutually angled sets of parallel reinforcing yarns of continuous glass filaments having a breaking elongation of 2.5 to 3.5% fixed to one another at their crossover points at an angle of 90° between the crossing sets of reinforcing yarns and the laid structure layer is disposed between two layers of the spunbonded web, the laid structure layer having a thread density of 0.5 to 2 threads/cm and wherein the spunbonded and laid structure layers are joined together by needling at 20 to 70 stitches/cm² in the absence of the use of a thermoplastic adhesive to join said layers of spunbonded web and said laid structure layer wherein said thermoplastic adhesive is rendered functional through the simultaneous application of heat and pressure.

* * * * *